United States Patent
Demma (10) Patent No.: US 9,090,210 B2
(45) Date of Patent: Jul. 28, 2015

(54) MOTOR VEHICLE WITH HEIGHT ADJUSTING DEVICE FOR LOADING FLOOR

(71) Applicant: GM GLOBAL TECHNOLOGY OPERATIONS LLC, Detroit, MI (US)

(72) Inventor: Dino Demma, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/939,281

(22) Filed: Jul. 11, 2013

(65) Prior Publication Data

US 2014/0015271 A1 Jan. 16, 2014

(30) Foreign Application Priority Data

Jul. 12, 2012 (DE) .................. 10 2012 013 753

(51) Int. Cl.
*B62D 25/20* (2006.01)
*B60R 5/04* (2006.01)

(52) U.S. Cl.
CPC .. *B60R 5/045* (2013.01); *B60R 5/04* (2013.01)

(58) Field of Classification Search
CPC ... B62D 25/20; B62D 25/2054; B62D 29/041
USPC ............ 296/37.16, 37.8, 191, 193.07, 37.6, 296/39.2, 184.1, 26.08, 26.09
See application file for complete search history.

(56) References Cited

U.S. PATENT DOCUMENTS

| 4,565,256 A | 1/1986 | Valdez |
| 5,228,532 A | 7/1993 | Browning et al. |
| 7,543,666 B2 | 6/2009 | Connelly et al. |
| 8,172,295 B2 | 5/2012 | Fischer et al. |
| 2010/0187857 A1 * | 7/2010 | Fischer et al. ............. 296/184.1 |

FOREIGN PATENT DOCUMENTS

| DE | 102008059680 A1 | 6/2010 |
| DE | 102009053138 A1 | 5/2011 |
| DE | 102010024320 A1 | 12/2011 |
| FR | 2886240 A1 | 12/2006 |
| FR | 2921314 A1 | 3/2009 |

OTHER PUBLICATIONS

German Patent Office, German Patent Search Report for Application No. 102012013758.2, dated May 3, 2012.

* cited by examiner

*Primary Examiner* — Joseph D Pape
*Assistant Examiner* — Dana Ivey
(74) *Attorney, Agent, or Firm* — Ingrassia Fisher & Lorenz PC (57) ABSTRACT

A motor vehicle includes, but is not limited to a loading floor, a height adjusting device for the loading floor with a guide, on which the loading floor is mounted pivotably on a front end portion about a pivot axis and movably for a movement with a component in vertical direction and the loading floor with the guide can be mounted in at least two different height positions, at least two support elements formed in a different vertical orientation for supporting a rear end portion of the loading floor in the at least two different height positions. The guide includes, but is not limited to a first guideway for moving the front end portion towards the top and a second guideway for moving the front end portion towards the bottom and the first and second guideway are formed spatially separated on the guide.

15 Claims, 8 Drawing Sheets

MOTOR VEHICLE WITH HEIGHT ADJUSTING DEVICE FOR LOADING FLOOR

CROSS-REFERENCE TO RELATED APPLICATION

This application claims priority to German Patent Application No. 10 2012 013 753.2, filed Jul. 12, 2012, which is incorporated herein by reference in its entirety.

TECHNICAL FIELD

The technical field relates to a motor vehicle, and particularly to a motor vehicle with a height adjusting device for a loading floor.

BACKGROUND

Motor vehicles with an internal combustion engine and/or electric motor for driving the motor vehicle and vehicle seats within a passenger compartment for accommodating persons are employed in order to transport persons. Such motor vehicles in general also have a load compartment for accommodating objects or luggage. Here, the load compartment is limited at the bottom by a loading floor and laterally in general by a body sidewall or a covering on the body sidewall and at the back by a body rear wall or a covering of a rear wall or also by a loading edge as body rear wall. In general, the load compartment is formed behind back seats or the backrest of back seats, i.e., the load compartment is limited towards the front by the back seats. The backrests of the back seats in this case can be generally pivoted about a pivot axis oriented in transverse direction of the motor vehicle, so that because of this upon a substantially horizontal pivoting of the backrests of the back seats a larger load compartment is available. For this reason, it can be required to fasten the loading floor at a higher height position with a height adjusting device, so that the enlarged load compartment both on the loading floor as well as on the folded-over backrests of the back seats is at a substantially identical height level. In addition, it can be required to arrange the loading floor only slightly below a loading edge or an upper edge of the body rear wall with an upper height position of the loading floor so that because of this objects or loaded goods have to be only slightly lifted on the loading floor in order to be able to remove these above the loading edge from the motor vehicle with an opened tailgate.

DE 10 2007 042 371 A1 shows a height adjusting device for the loading floor of a motor vehicle with at least one guide, on which the loading floor is pivotably guided about a first pivot axis. The loading floor can be guided from a lower loading floor position into an upper loading floor position. Here, the loading floor comprises a rear loading floor portion and a front loading floor portion, which are pivotably connected to one another about a second pivot axis. The loading floor in the region of the second pivot axis can be lifted in such a manner that the rear and the front loading floor portion can be pivoted against one another, and the guide is designed such that the loading floor by lifting in the region of the second pivot axis is moved along the guide from the lower into the upper loading floor position. For moving the loading floor with the height adjusting device from a lower into an upper loading floor position, complicated pulling and pushing on the rear end region of the loading floor is thus required.

At least one object is to make available a motor vehicle with a height adjusting device, in which the loading floor can be easily moved with little expenditure of force from a lower height position into an upper height position and vice versa. In addition, other objects, desirable features and characteristics will become apparent from the subsequent summary and detailed description, and the appended claims, taken in conjunction with the accompanying drawings and this background.

SUMMARY

A motor vehicle is provided that comprises a loading floor, a height adjusting device for the loading floor with a guide, on which the loading floor on a front end portion is mounted pivotably about a pivot axis and movably mounted for a movement with a component in vertical direction and the loading floor with the guide can be mounted in at least two different height positions, at least two support elements formed in a different vertical orientation for supporting a rear end portion of the loading floor in the at least two different height positions. The guide comprises a first guideway for moving the front end portion towards the top and a second guideway for moving the front end portion towards the bottom and the first and second guideway are formed spatially separated on the guide.

The guide thus comprises two separate guideways, namely the first guideway for moving the front end portion towards the top, i.e., a movement with a component in vertical direction towards the top and a second guideway for moving the front end portion towards the bottom, i.e., for moving with a component in vertical direction downwards. The two first and second guideways in this case are formed spatially separated on the guide, so that because of this the movement of the loading floor towards the top and the movement of the loading floor towards the bottom is spatially and kinematically separated and because of this an easier handling of the moving of the loading floor towards the top and towards the bottom is ensured. The pivot axis is preferentially oriented substantially in a transverse direction.

In particular, the first guideway serves for the exclusive moving of the front end portion towards the top and preferentially towards the bottom and the second guideway serves for the exclusive moving of the front end portion towards the bottom and/or the first and second guideway are formed in longitudinal direction of the motor vehicle at a distance for example of at least about 0.5 cm, about 1 cm or about 3 cm from one another.

In a further embodiment, the guide is divided into a left and right guide. In a complementary embodiment, a left and right guide bolt is formed laterally on the front end portion of the loading floor and the left guide bolt is mounted in the left guide and the right guide bolt is mounted in the right guide. Thus, the loading floor is mounted by the guide on two sides. Practically, the geometry of the left and right guide is substantially formed identically.

Preferentially, the guide, in particular the first guideway, comprises at least two support surfaces for supporting the loading floor in the at least two different height positions and/or the right and left guide bolt are mounted in the first guideway and preferentially the second guideway. The at least one support surface in this case preferentially comprises at least partially a horizontally formed portion and is in particular curved concavely.

In a variant, the first guideway is formed on a rear-end slide limitation at an acute angle, in particular between about 2° and about 60°, preferentially between about 5° and about 45° with respect to a fictitious vertical plane in a section in longitudinal direction, so that with a force having a component acting horizontally towards the back on the loading floor, the loading floor can be moved towards the top at the rear-end slide limitation. By pulling the loading floor on a rear end portion towards the back, a force with a horizontal component directed towards the back can be exerted on the loading floor and because of this the loading floor because of the orientation of the rear-end slide limitation, moved towards the top. Practically, the rear-end slide limitation is formed between the at least two support surfaces.

In a further embodiment, the first and/or the second guideway are formed as a guide groove. Within a guide groove, the guide bolt can be mounted in a particularly simple manner. In particular, the first guideway is arranged in longitudinal direction behind the second guideway. Practically, the first guideway in this case is arranged in longitudinal direction behind the second guideway by at least about 0.5 cm, about 1 cm, about 2 cm or about 13 cm.

In a further embodiment, an end in transverse direction of the second guideway has a greater distance in longitudinal direction of the motor vehicle with respect to a fictitious vertical center plane than an end in transverse direction of the first guideway. The end in transverse direction of the second guideway is thus formed further laterally than the end in transverse direction of the first guideway. Here, the distance between the end in transverse direction of the second guideway to the end in transverse direction of the first guideway preferentially corresponds to the extent of the second guideway in the transverse direction. The second guideway in this respect constitutes a depression in transverse direction with respect to the first guideway. The second guideway in this case is formed for the slide mounting of a guide pin.

In a complementary variant, a left and right guide pin spring loaded in transverse direction are formed on the loading floor and the guide pin is mounted in the second guideway, in particular exclusively upon a movement of the front end portion of the loading floor from an upper height position, in particular the uppermost height position, to a lower height position, in particular the lowermost height position.

Practically, during the moving of the loading floor towards the top, the guide pin rests on an end in transverse direction of the first guideway and on a moving of the loading floor, in particular towards the top and/or back, the guide pin is automatically insertable into the second guideway because of the spring loading, so that because of this the loading floor upon an arrangement of the guide pin, in particular of the left and right guide pin in the left and right second guideway, the loading floor, is guided or mounted in particular exclusively by the second guideway.

In a further embodiment, the guide pin is movably arranged within an axial bore on the guide bolt. Practically, the diameter of the guide pin is smaller than the diameter of the guide bolt. Preferentially, a method described in this patent application can be carried out by the motor vehicle, in particular the height adjusting device with the loading floor.

In particular, on the second guideway on a lower end region, a ramp is formed for moving the guide pin in transverse direction to the inside upon a movement of the front end portion of the loading floor from an upper height position, in particular the uppermost height position, to a lower height position, in particular the lowermost height position. Upon a movement of the loading floor towards the bottom in the second guideway, the guide pin because of the ramp is automatically moved in the direction of a vertical center plane in longitudinal direction of the motor vehicle and because of this the guide pin moved out of the second guideway and following this the guide pin again rests on an end in transverse direction of the first guideway.

In a further configuration, the left and/or right guide bolt can be fastened with a slotted guide in transverse direction in two different positions on the loading floor, so that in an outer transverse position of the left and/or right guide bolt the left and right guide bolt is mounted in the left and right guide and in an inner transverse position the left and/or right guide bolt, the left and right guide bolt are arranged outside the left and right guide. With the inner transverse position of the left and right guide bolt, the loading floor can thus be removed from the guide and because of this also removed from the motor vehicle. In the outer transverse position of the left and/or right guide bolt and an arrangement of the left and/or right guide bolt on the guide, in particular the first and/or second guideway, the loading floor is thus connected to the guide and mounted. In a further configuration, the guide is indirectly or directly fastened to a body sidewall for the lateral limitation of a load compartment and/or the at least one protrusion is indirectly or directly fastened to a loading edge as body rear wall for the rear end limitation of the load compartment.

A method according to an embodiment for adjusting the height position of a loading floor in a motor vehicle with the steps: exerting a force on the loading floor with a horizontal component towards the back, so that because of this due to the geometry of the guide the loading floor on a front end portion is moved towards the top. The loading floor from a lower to an upper height position, in particular between all height positions towards the top, is exclusively moved towards the top by means of an exerting of the force on the loading floor with a horizontal component towards the back, because of the geometry of the guide. Practically, on reaching a height position, in particular an uppermost height position, the loading floor is exclusively guided in a second guideway.

In an additional embodiment, the loading floor is moved towards the top on the guide, in particular exclusively on a first guideway. Practically, the loading floor in the process is moved spatially separated in the first and second guideway. Practically, because of the geometry of the second guideway, the loading floor upon a mounting in the second guideway, automatically moves downwards because of gravity.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
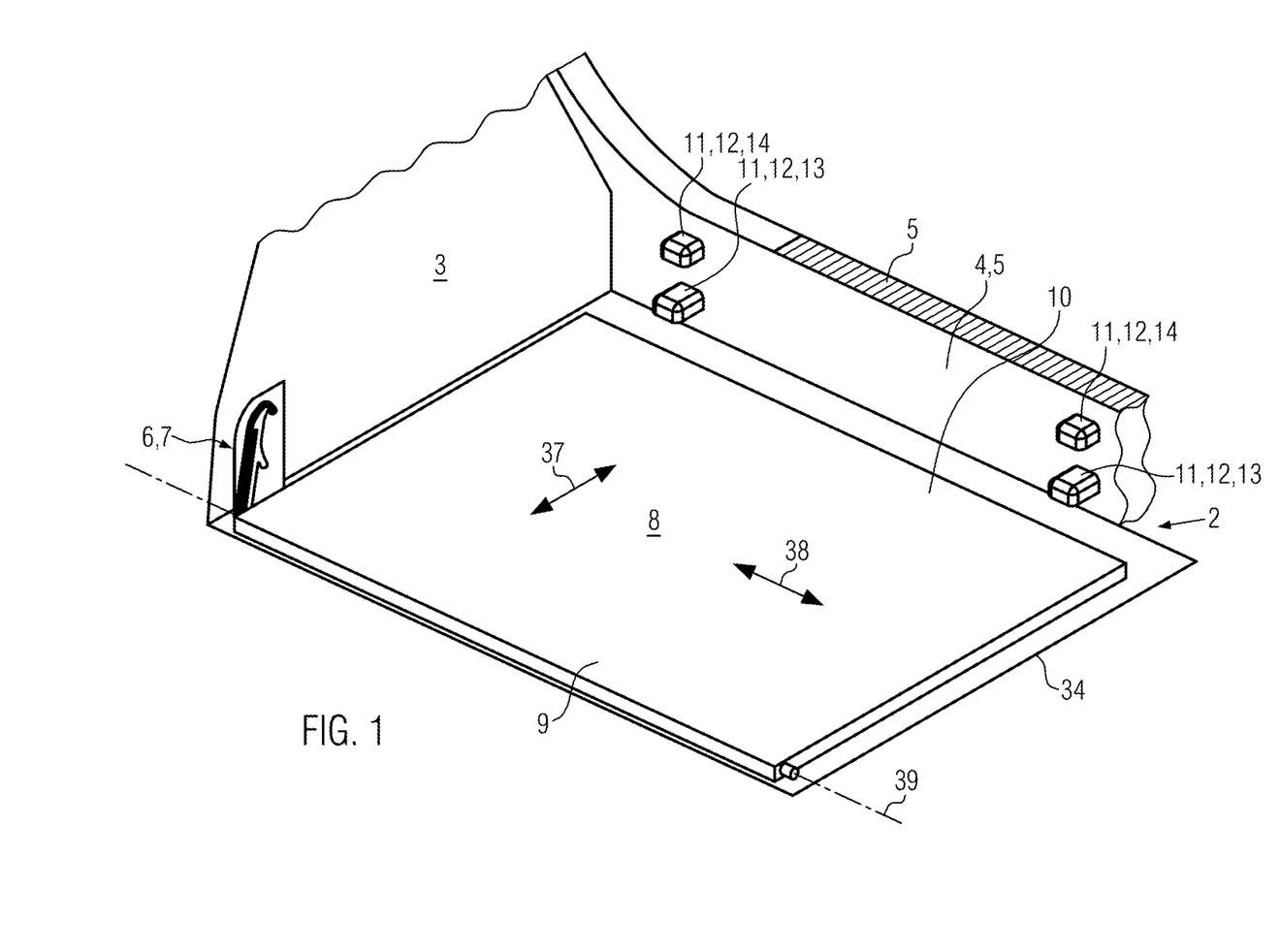
FIG. 1 is a perspective view of a load compartment with a loading floor and a right guide for the loading floor.
Figure 2:
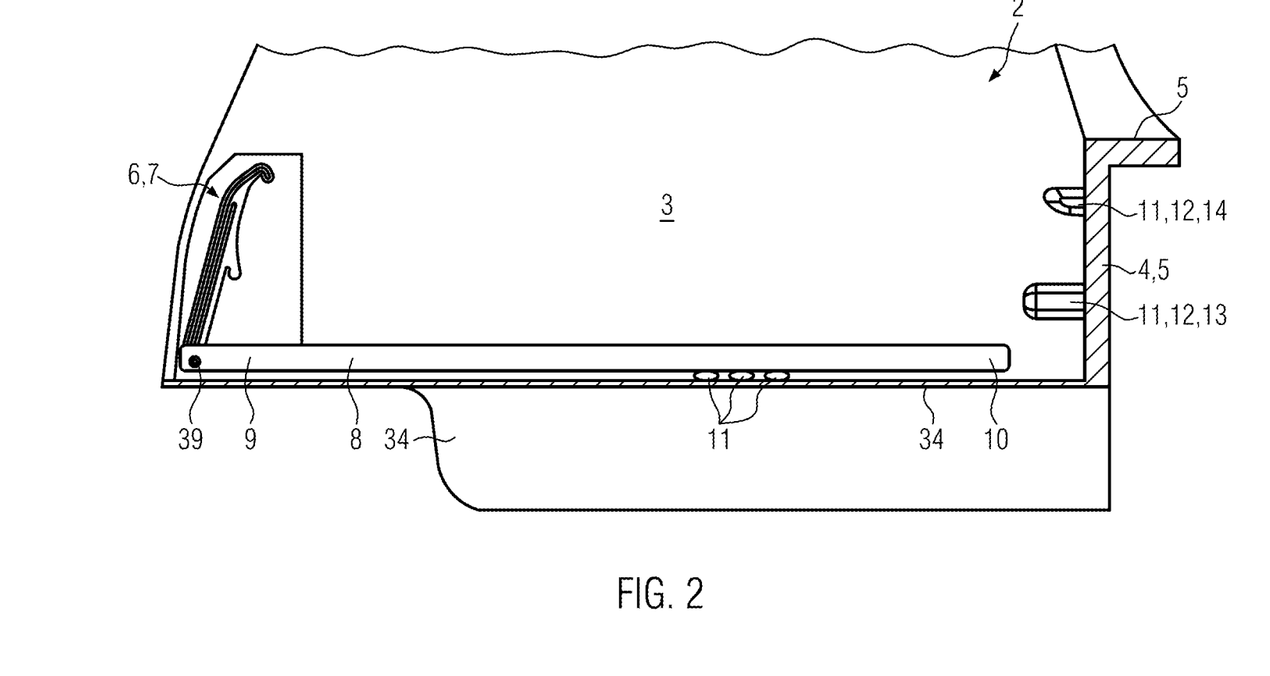
FIG. 2 is a lateral view of the loading floor according to FIG. 1 in a lower height position, the right guide and of support elements.
Figure 3:
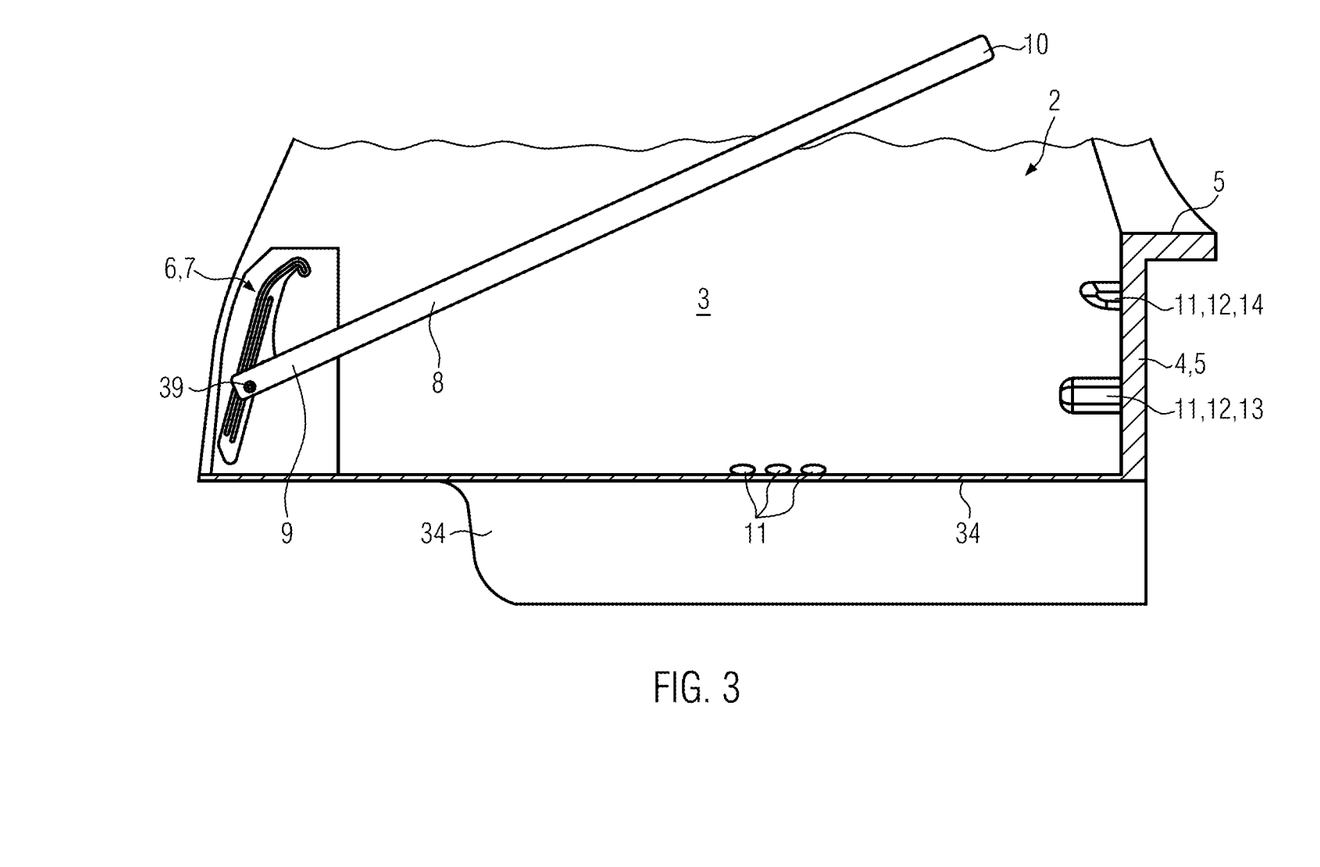
FIG. 3 is a lateral view of the loading floor according to FIG. 2 while moving the loading floor from the lower height position into a middle or upper height position.
Figure 4:
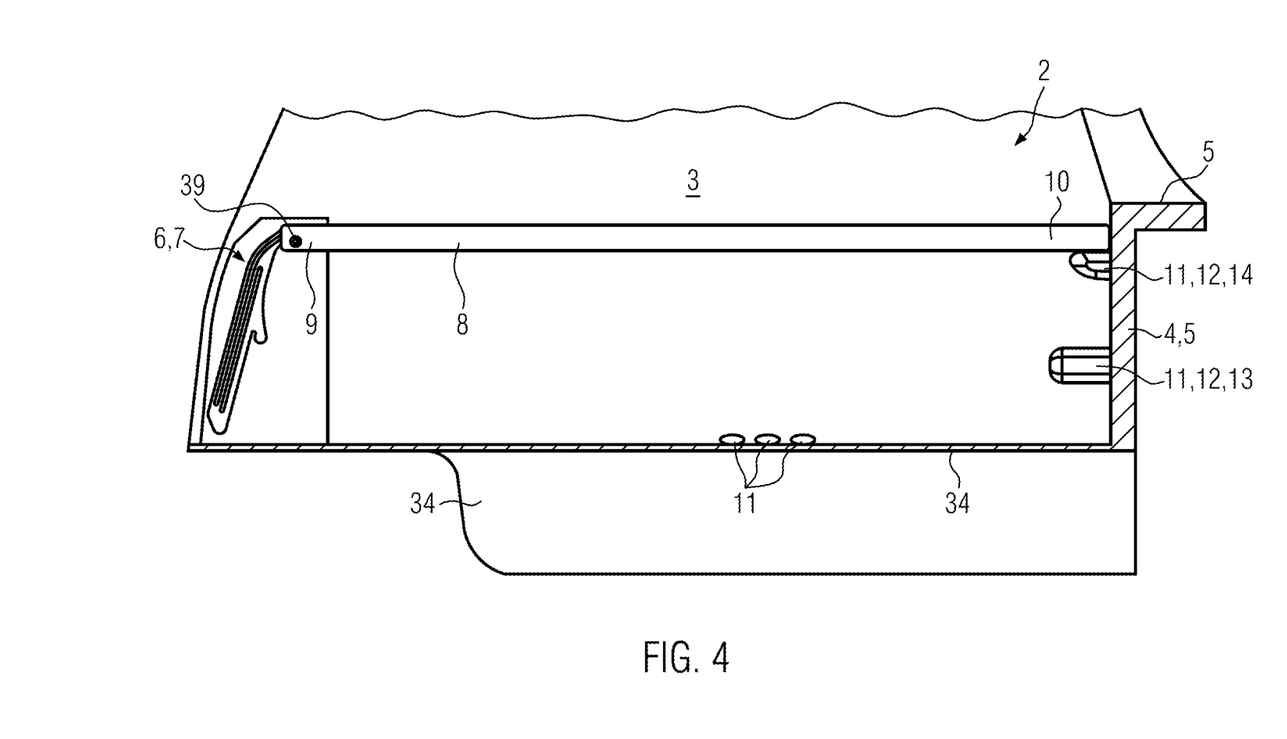
FIG. 4 is a lateral view of the loading floor according to FIG. 2 in the upper height position.
Figure 10:
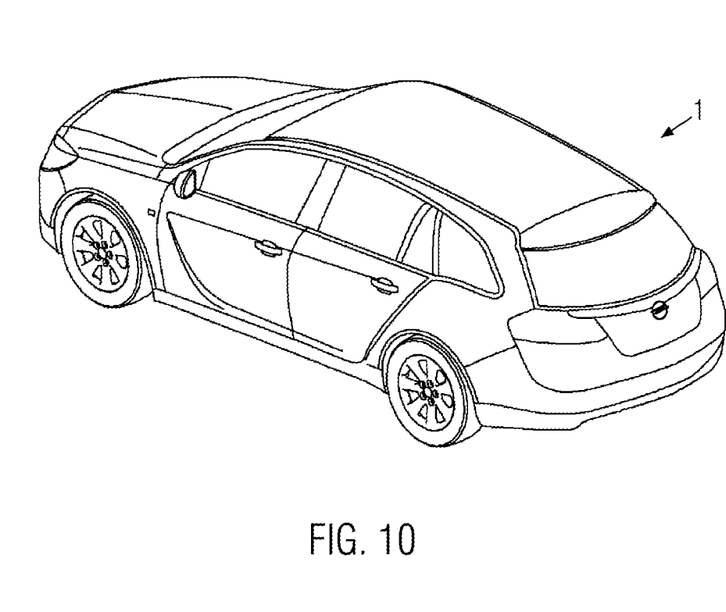
FIG. 10 is a lateral view of a motor vehicle.

A motor vehicle 1 shown in FIG. 10 comprises an internal combustion engine and/or electric motor for driving the motor vehicle. Within the motor vehicle 1, an interior space is present having two front seats and three back seats. It relates to a five-door motor vehicle 1 with four side doors for passengers to get in and out and a rear end fifth door as tailgate for loading and unloading a load compartment 2 (FIG. 1). The load compartment 2 in this case is limited towards the back by a body rear wall 4 or a covering on the body rear wall 4 as loading edge 5 and laterally by two body side walls 3 or coverings on the body side walls 3. Towards the front, the load compartment 2 is limited by the backrests of the three back seats (not shown). The load compartment 2 is limited towards the bottom by a plate-shaped substantially rectangular loading floor 8 of metal and/or plastic. The loading floor 8 in this case is substantially oriented horizontally within the motor vehicle 1. A front end portion 9 of the loading floor 8 is mounted on a guide 7 as height adjusting device 6 and on the rear end portion 10 of the loading floor 8, the loading floor 8 rests on the support elements 11. In FIG. 2 to FIG. 4, three support elements 11 as lowermost support elements 11 are shown for supporting the loading floor in a lower height position. Above the two lower support elements 11, two protrusions 12 as middle protrusions 13 are formed on the body rear wall 4 and above the two middle protrusions 13, two upper protrusions 14 are formed. In the middle height position of the loading floor, the rear end portion 10 rests on the two middle protrusions 13 as support elements 11 and in the upper height position of the loading floor 8, the latter rests on the two upper protrusions 14. Below the loading floor 8, a body floor wall 34 is formed and between the body floor wall 34 and below the loading floor 8, additional loading goods, e.g. a spare wheel and/or tools can be stored.

Figure 7:
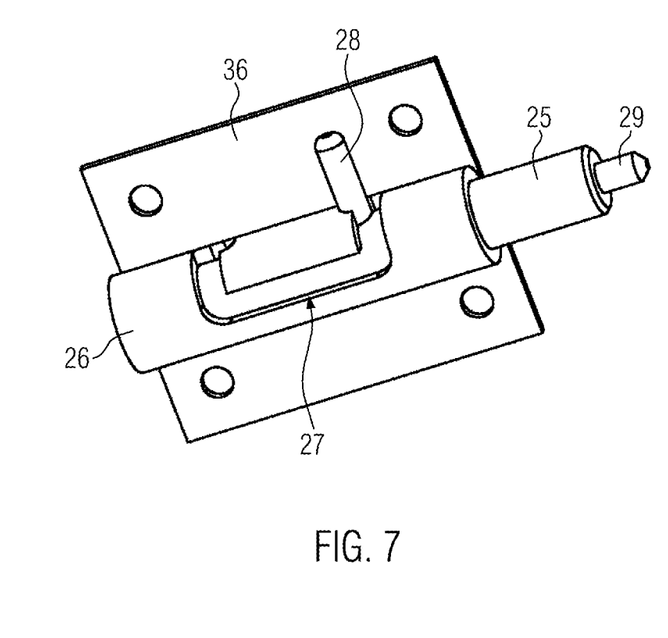
FIG. 7 is a perspective view of a guide bolt in a slide bearing socket with a slotted guide in an outer transverse position.
Figure 8:
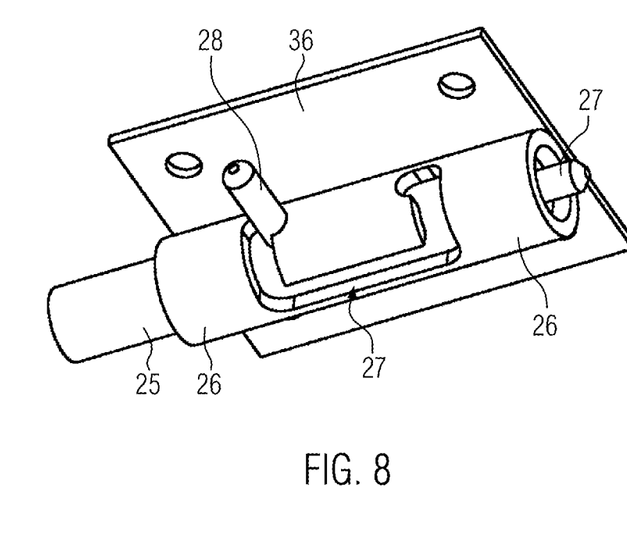
FIG. 8 is a perspective view of the guide bolt according to FIG. 7 in the slide bearing socket with the slotted guide in an inner transverse position.

On the front end portion 9 of the loading floor 8, a fastening plate 36 each (FIGS. 7 and 8) is fastened laterally at the bottom. On each fastening plate 36, a slide bearing socket 26 is fastened and, coaxially or concentrically to the slide bearing socket 26, a guide bolt 25 is mounted on said slide bearing socket 26. On the slide bearing socket 26, a slotted guide 27 is formed, so that in the position of the guide bolt 25 axially within the slide bearing socket 26 shown in FIG. 7, the guide bolt 25 is in an outer transverse position. In FIG. 8, the guide bolt 25 is in an inner transverse position. Upon a movement of the guide bolt 25 from the outer into the inner transverse position, the guide bolt 25 thus performs a movement in direction of a transverse direction 38 of the motor vehicle 1. The transverse direction 38 in this case is oriented perpendicularly to a longitudinal direction 37 of the motor vehicle 1. In the slotted guide 27, a slotted guide nose 28 is fastened to the guide bolt 25, so that by means of moving the slotted guide nose 28 within the slotted guides 27, the guide bolt 25 can be moved from the outer into the inner transverse position and vice versa. In the outer transverse position, the two guide bolts 25 are fastened to and mounted on the guide 7 and in the inner transverse position of the two guide bolts 25, the guide bolts 25 are not mounted on the guide 7 so that because of this the loading floor 8 can be removed from the motor vehicle 1 or the guide 7. Here, a left and right guide 7 each are fastened to the left and right body side wall 3.

Figure 9:
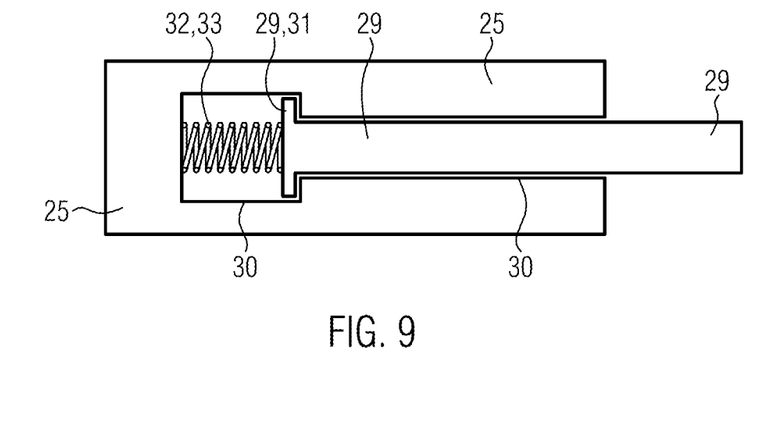
FIG. 9 is a longitudinal section of the guide bolt with a guide pin.

The guide bolt 25 comprises a bore 30 (FIG. 9) and within the bore 30 a guide pin 29 is coaxially mounted on the bore 30 in the guide bolt 25. The bore 30 in this case has a larger diameter or radius on a first portion than on a second portion (FIG. 9). The guide pin 29 is mounted on the second portion of the bore 30 and because of a stop plate 31 at the rear end of the guide pin 29, the guide pin 29 can only be moved as far as to the position of a spring 33 as elastic element 32 shown in FIG. 9. If a force directed to the left is exerted on the guide pin 29 according to the representation in FIG. 9 outside, e.g. on the right end, the guide pin 29 can be moved to the left against the force exerted on the guide pin 29 by the spring 33.

Figure 5:
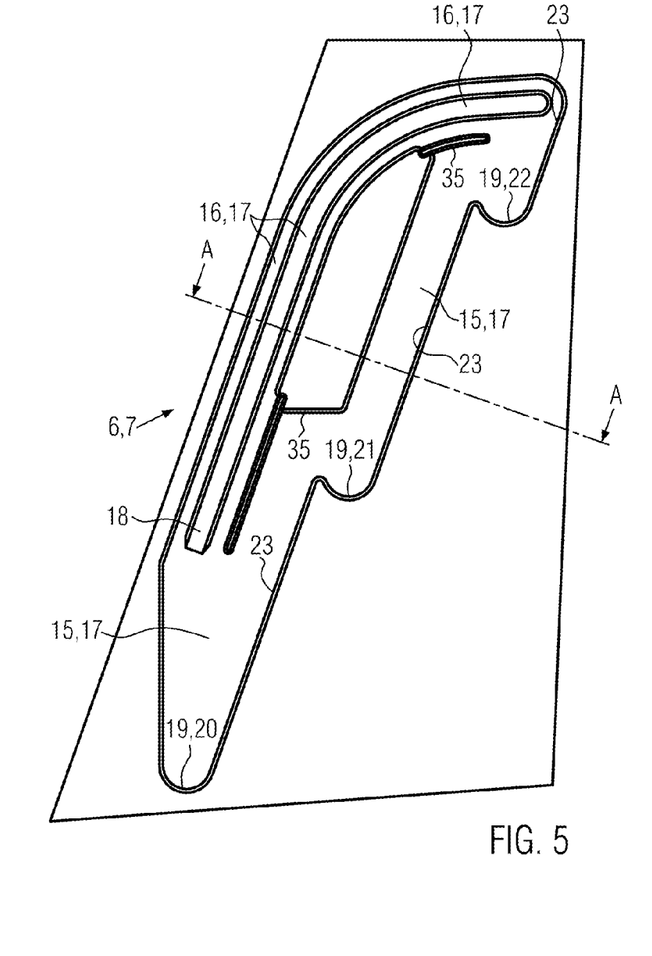
FIG. 5 is a lateral view of the right guide.
Figure 6:
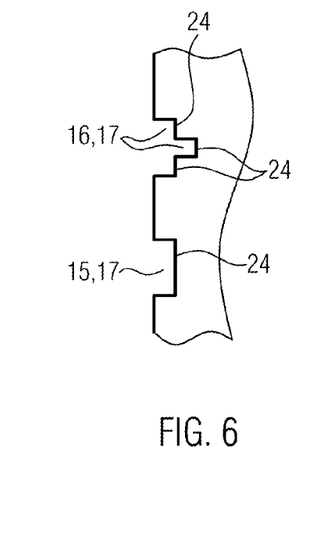
FIG. 6 is a section A-A according to FIG. 5 of the guide.

FIG. 5 shows a lateral view of the right guide 7 according to the representation in FIG. 1. The left guide 7 which is not shown in FIG. 1 in this case is formed in mirror image to the guide 7 shown in FIG. 1 or 5. FIG. 6 shows a section A-A through the guide 7 perpendicularly to the drawing plane of FIG. 5. A first guideway 15 as guide groove 17 serves for moving the loading floor 8 or the guide bolt 25 in the first guideway 15 towards the top. The first guideway 15 comprises a rear-end slide limitation 23 and the rear-end slide limitations 23 are formed between a lower support surface 20 a middle support surface 21 and an upper support surface 22. The rear end and flat slide limitation 23 in this case is inclined towards the back at an angle of approximately 20° to a vertical plane, so that because of this when exerting a pulling force on the loading floor 8 with a component towards the back a force with a component towards the back in longitudinal direction 37 is likewise exerted on the guides bolt 25 and because of this the guide bolt 25 on the rear-end slide limitation 23 slides or moves automatically from a lower or middle support surface 20, 21 to a middle or upper support surface 21, 22. A second guideway 16 serves for moving the loading floor 8 towards the bottom. When the loading floor is in the lower height position according to the representation in FIG. 2, the two guide bolts 25 rest on the lower support surface 20 as support surface 19 and a rear end portion 10 or a middle end portion 10 of the loading floor 8 rests on the support elements 11. For moving the loading floor 8 from the lower height position into a middle height position, a force directed towards the back has to be exerted on the loading floor 8 on the rear end portion 10, so that because of this the two guide bolts 25 on the rear-end slide limitation 23 are moved towards the top as far as to the middle support surface 21. Exerting this force on the loading floor 8 is particularly simple since from the lower height position of the loading floor 8, the loading floor 8 can be pivoted about a pivot axis 39 in transverse direction 38 of the motor vehicle through the guide bolts 25 from the rotary angle position shown in FIG. 2 into the rotary angle position shown in FIG. 3 and moved towards the top. Following the resting of the guide bolts 25 on the two middle support surfaces 21, the loading floor 8 can be pivoted again into a horizontal orientation, so that because of this the rear end portion 10 of the loading floor 8 rests on the two middle protrusions 13 (not shown). To further move the loading floor 8 from the middle height position (not shown) to the upper height position according to FIG. 4, what has just been described has to be repeated, i.e., the loading floor 8 pivoted, following this a force directed towards the back exerted on the loading floor 8 so that because of this the two guide bolts 25 on the two rear-end slide limitations 23 of the left and right guide 7 are moved towards the top to the upper support surface 22. Following this, the loading floor 8 can be pivoted on the rear end portion 10 and moved or pivoted downwards to the upper protrusions 14. Deviating from this, the loading floor 8 or the guide bolt 25 can also be moved from the lower support surface 20 to the upper support surface 22 in one operation. Removing the guide bolts 25 on the rear-end slide limitation 23 towards the top, a guide stop 35 serves to move the guide bolts 25 into the support surface 19 and simultaneously mechanically indicate to the user that the next higher support surface 19 for supporting the guide bolts 25 is now available.

For moving the loading floor 8 from the upper height position shown in FIG. 4 into the lower height position shown in FIG. 2, the loading floor 8, as has just been described, has to be pivoted about a pivot axis 39 on the guide bolt 25, so that the rear-end portion 10 of the loading floor 8 during the pivot movement is moved towards the top and subsequently a force directed to the back can be exerted on the loading floor 8, so that because of this the two guide bolts 25 are moved once again from the vertical position in the upper support surface 22 upwards on the rear-end slide limitation above the upper support surface 22. During this movement of the guide bolts 25 towards the top or of the front end portion 9 of the loading floor 8 towards the top, the two guide pins 29 in the left and right guide bolts 25 can be moved into the second guideway 16 by means of the spring 33 (FIG. 6), since an end 24 in transverse direction 38 of the second guideway 16 as guide groove 17 is formed deeper than that of the first guideway 15. Because of this, the guide pin 29 snaps into the guide groove 17 of the second guideway 16 and because of the geometry of the second guideway 16 with an inclination, the front end portion 9 of the loading floor 8 with the two guide bolts 25 or the guide pins 29 in the second guideway 16 automatically moves downwards due to gravity. At the lower end of the second guideway 16, a ramp 18 (FIG. 5) is formed, so that because of the ramp 18 the guide pin 29 is again moved into the guide bolt 25 against the spring 33. Because of the gravity and the geometry of the guide 7, the guide bolts 25 automatically drop into the lower support surface 20 after leaving the second guideway 16.

In addition, it is also possible to move the two guide bolts 25 from the upper support surface 22 to the middle support surface 21 in that with the two guide bolts 25 resting on the upper support surface 22, a force with a horizontal component towards the front is exerted on the loading floor 8 and because of this the two guide bolts 25 in the first guideway 15 move from the upper support surface 22 to the middle support surface 21. Analogously, this applies also to a movement of the two guide bolts 25 from the middle support surface 22 to the lower support surface 20.

Viewed on the whole, substantial advantages are connected to the motor vehicle 1 according to the invention. The height adjusting device 6 with the guide 7, the support elements 11 and the guide bolts 25 with guide pins 29 is particularly easy to operate. By simply applying a pulling force directed towards the back on the loading floor 8 at the rear end portion 10 with an opened tailgate, the loading floor 8 can be moved both from a support surface 19 located further down to a support surface 19 located further up and also from the uppermost support surface 19, i.e., the upper support surface 22 to a lowermost support surface 19, i.e. the lower support surface 20. The operation is particularly simple because having to merely exert a pulling force on the rear end portion 10 of the loading floor 8 is particularly comfortable to a user.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
   a loading floor;
   a height adjusting device for the loading floor with a guide on which the loading floor on a front end portion is mounted pivotably about a pivot axis and movable for movement with a component in a vertical direction and the loading floor with the guide is mounted in at least two different height positions; and
   at least two support elements formed in a different vertical orientation for supporting a rear end portion of the loading floor in the at least two different height positions,
   wherein the guide comprises a first guideway for moving the front end portion towards a top guideway and a second guideway for moving the front end portion towards the bottom and the first guideway and the second guideway are spatially separated on the guide; and
   wherein the first guideway is configured such that exerting a backward longitudinal pulling force on the loading floor results in movement of the loading floor from a lower height position to an upper height position.

2. The motor vehicle according to claim 1, wherein the first guideway provides exclusive moving of the front end portion towards the top and the second guideway provides exclusive moving of the front end portion towards the bottom, and the first guideway is formed in longitudinal direction of the motor vehicle at a distance of at least 0.5 cm.

3. The motor vehicle according to claim 1, wherein the guide comprises a left guide and a right guide.

4. The motor vehicle according to claim 3, wherein the front end portion of the loading floor includes a left guide bolt and a right guide bolt, the left guide bolt is mounted in the left guide, and the right guide bolt is mounted in the right guide.

5. The motor vehicle according to claim 4, wherein the guide comprises at least two support surfaces for supporting the loading floor in the at least two different height positions and the right guide bolt and the left guide bolt is mounted in the first guideway and the second guideway.

6. The motor vehicle according to claim 5, wherein the first guideway is located on a rear-end slide limitation at an acute angle between approximately 2° and approximately 60° with respect to a fictitious vertical plane at a section in longitudinal direction, so that the loading floor moves towards the top on the rear-end slide limitation when subjected to a force having a directional component acting toward the back of the loading floor.

7. The motor vehicle according to claim 6, wherein the rear-end slide limitation is formed between the at least two support surfaces.

8. The motor vehicle according to claim 4, wherein the left guide bolt is fastened to the loading floor with a slotted guide in a transverse direction in two different positions so that in an outer transverse position of the left guide bolt the left guide bolt and the right guide bolt are mounted in the left guide and the right guide and in an inner transverse position of the left guide bolt the left guide bolt and the right guide bolt are arranged outside the left guide and the right guide.

9. The motor vehicle according to claim 1, wherein the first guideway includes a guide groove.

10. The motor vehicle according to claim 1, wherein the first guideway in a longitudinal direction is arranged behind the second guideway.

11. The motor vehicle according to claim 1, wherein an end in a transverse direction of the second guideway with respect to a fictitious vertical center plane in a longitudinal direction of the motor vehicle has a greater distance than an end in transverse direction of the first guideway.

12. The motor vehicle according to claim 1, wherein a left guide pin and a right guide pin, which are spring-loaded in transverse direction, are formed on the loading floor and the right guide pin is mounted in the second guideway exclusively during a movement of the front end portion of the loading floor from an upper height position to a lower height position.

13. The motor vehicle according to claim 12, wherein the right guide pin is movably arranged within an axial bore on a guide bolt.

14. The motor vehicle according to claim 13, wherein the second guideway on a lower end region includes a ramp for moving the right guide pin in a transverse direction to the inside upon the movement of the front end portion of the loading floor from an upper height position into a lower height position.

15. The motor vehicle according to claim 1, wherein the guide is fastened to a body side wall for a lateral limitation of a load compartment and at least one protrusion is fastened to a loading edge as a body rear wall for a rear-end limitation of the load compartment.

\* \* \* \* \*